United States Patent Office
2,963,468
Patented Dec. 6, 1960

2,963,468

POLYMERIZATION PROCESS USING NITROGEN FLUORIDES

Charles S. Cleaver, Wilmington, Del., assignor to E. I. du Pont de Nemours and Company, Wilmington, Del., a corporation of Delaware No Drawing. Filed May 8, 1959, Ser. No. 811,773

19 Claims. (Cl. 260—87.5)

This invention relates to the polymerization of organic compounds, and more particularly to new catalysts for the polymerization of unsaturated monomers capable of addition polymerization.

This application is a continuation-in-part of my copending United States application Serial No. 753,425, filed August 6, 1958.

Addition polymers, because of their versatile properties and relatively low cost, have penetrated many large volume industrial outlets and in many instances have essentially displaced the naturally occurring polymers. In spite of the great progress which has been made in the understanding of polymerization catalysis and of polymer structure, new catalysts are continuously being sought which are either more active and hence permit the use of milder polymerization conditions, or which give radically new polymer structures, or which provide a broader spectrum of use than presently known catalysts, or which combine two or all of these desired goals.

This invention has as an object the provision of radically new polymerization catalysts for monomers capable of addition polymerization. A further object is the provision of a process for the polymerization of polymerizable organic compounds. Still another object is to prepare addition polymers having improved properties.

These and other objects are accomplished by the following invention, wherein unsaturated monomers capable of addition polymerization are polymerized by a process which consists in adding a nitrogen fluoride of the group of dinitrogen difluoride ($N_2F_2$), dinitrogen tetrafluoride ($N_2F_4$), and nitrogen fluorides of the general formula:

in which all of the X's are the same or different and represent fluorine or perfluoroaliphatic hydrocarbon radicals, i.e., perfluoroalkyl or perfluoroalicyclic groups, to such a monomer at a temperature up to 300° C., and recovering the polymer thus formed.

In one method for operating in accord with this invention, a pressure reactor is charged with the unsaturated monomer and reaction medium, if any. The reactor is connected to an evacuation system, cooled to a temperature of about —80° C., and evacuated to remove oxygen. A measured amount of a nitrogen fluoride is then injected and the system is maintained at the temperature selected for the polymerization. The desired polymer is recovered from the reaction mixture by conventional methods.

In place of using an injector for adding the nitrogen fluoride, it may be added by connecting the evacuated reactor to a source of the nitrogen fluoride maintained at a higher pressure. The amount of nitrogen fluoride added is determined from the loss in weight of the source container. Obviously other methods known to those skilled in the art can be used for introducing the nitrogen fluoride into the reaction mixture.

The nitrogen fluorides used as catalysts in the process of this invention are prepared by known methods. Thus, $NF_3$ is the chief product in the electrolysis of molten ammonium acid fluoride ($NH_4HF_2$) with a graphite anode at 125° C. (J. H. Simons, "Fluorine Chemistry," Academic Press, Inc., New York, N.Y. (1950), pages 85 and 86). Dinitrogen difluoride can be made by heating $N_3F$ at 25° to 100° C. under reduced pressure, and the perfluoroaliphatic hydrocarbon substituted nitrogen fluorides by the methods of U.S. 2,519,983; J. Chem. Soc. 1951, 102; ibid, 1949, 3080, or J. Am. Chem. Soc. 74, 710 (1952). The dinitrogen difluoride produced by the above methods consists of a mixture of the two stereoisomeric forms, i.e., the cis- and trans-forms. The isomeric mixture may be resolved by gas chromatography over activated alumina at 0° C. By this method there is obtained a product which is a clear liquid at —196° C. and which is believed to be the cis-form. There is also obtained a product which at —196° C. is a white solid and which is thought to be the trans-form. The clear liquid, or cis-form, is highly active catalytically and is employed as a catalyst in polymerizations which are to be carried under especially mild temperature conditions. The trans or crystalline solid form is also catalytically active but it manifests its activity under generally higher temperature conditions than does the cis-form.

The mixture of the two isomers as generally obtained is also catalytically active. Its activity is closer to that of the pure cis-form than to that of the pure trans-form.

Specific examples of nitrogen fluorides which are operative in the process of the present invention include dinitrogen difluoride ($N_2F_2$), nitrogen trifluoride ($NF_3$), dinitrogen tetrafluoride ($N_2F_4$), trifluoromethyldifluoronitride, bis(trifluoromethyl)fluoronitride, pentafluoroethyldifluoronitride, bis(pentafluoroethyl)fluoronitride, nonafluorobutyldifluoronitride, heptadecafluorooctyldifluoronitride, bis(uncosafluorodecyl)fluoronitride, pentacosafluorododecyldifluoronitride, bis(undecafluorocyclohexyl)fluoronitride, undecafluorocyclohexyldifluoronitride, perfluoropiperidine, and the like. Mixtures of the above with perfluorocarbons and perfluorocarbon nitrides can also be used as catalysts. When the mixtures are used, compensation in the catalyst concentration should be made because the perfluorocarbon compounds and the perfluorocarbon nitrides are catalytically inactive.

The polymerization process of this invention is carried out at temperatures which can be as low as —80° C. or as high as +300° C. Usually, however, good reaction rates with good conversion to polymer are obtained at temperatures of from 25° to 275° C. This range represents the temperature conditions generally used.

The polymerization can also be effected with the use of light of wave lengths of 3100 to 4500 A.

As a rule the reaction is permitted to proceed at reaction temperature for at least 0.5 hour. Generally no advantages accrue by prolonging the reaction time beyond 15 hours and this represents a practical time limit, but longer times may be employed.

The polymerization process of this invention is carried out under a positive pressure, i.e., a pressure which is at least atmospheric. Pressures in excess of 5000 atmospheres are not used because they do not result in improved polymer yields or increased reaction rates. This therefore represents a practical operating upper pressure limit. Generally, the best balance of product yield and reaction rate is attained within the range of 3 to 3000 atmospheres and this embraces the preferred operating pressure conditions.

The amount of nitrogen fluoride, i.e., dinitrogen difluoride, nitrogen trifluoride, dinitrogen tetrafluoride, or $FN(X_1X_2)$ compound used is at least 0.0001% by weight of the unsaturated monomer being polymerized. As a rule, however, the amount employed is within the range of 0.1 to 30% by weight of the unsaturated monomer.

The new nitrogen fluoride catalysts of this invention are effective for the polymerization of any of the monomers known to be capable of addition polymerization. Examples of such polymerizable monomers are carbon monoxide, ethylene, sulfur dioxide, propylene, perchloropropylene, butenes, butadiene, 2-fluorobutadiene, 2-phenoxybutadiene, styrene, vinylene carbonate, vinylnaphthalene, methylstyrene, 1,1,4,4-tetrafluorobutadiene, 2-chlorobutadiene-1,3, vinylcyclohexene, 2-methylbutadiene-1,3, 2-cyanobutadiene-1,3, 2,3-dimethylbutadiene-1,3, o-divinylbenzene, 1,2,4-trivinylbenzene, vinyl acetate, vinyl trimethylacetate, vinyl chloroacetate, vinyl stearate, vinyl chloride, vinylidene chloride, vinyl fluoride, chlorotrifluoroethylene, 1-chloro-2-fluoroethylene, 1-chloro-1-fluoroethylene, 1-chloro-1,2-difluoroethylene, 1,1-dichloro-2,2-difluoroethylene, tetrafluoroethylene, vinyldioxolane, methyl vinyl ether, methyl vinyl ketone, N-vinylimides, e.g., N-vinylphthalimide, N-vinylsuccinimide, N-vinyllactams, e.g., N-vinylcaprolactam, acrylo- and methacrylonitriles, acrylic and methacrylic acids and their esters and amides, e.g., methyl acrylate, methyl methacrylate, glycidyl methacrylate, propyl methacrylate, octyl methacrylate, n-butoxyethoxyethyl methacrylate, β-diethylaminoethyl methacrylate, ethylene glycol monomethacrylate, acrylamide, N-alkylacrylamides, e.g., N-butylacrylamide, etc., chloroethyl methacrylate, methacrylamide, maleic anhydride, acrylic and methacrylic anhydrides, vinyl methacrylate, allyl methacrylate, crotyl methacrylate, methallyl acrylate, diallyl acrylate, divinyl adipate, vinyl succinate, divinyl adipate, acrolein, maleimide, fumaric esters, e.g., diethyl fumarate, dipropyl fumarate, dicyclohexyl fumarate, etc., perfluoro-2-butyne, perfluoro-2-pentyne, perfluoro-2-hexyne, perfluoro-3-hexyne, and the like. The preferred class of polymerizable monomers for use in this invention are the polyhaloolefins, particularly the perfluoroolefins and the perchlorofluoroolefins.

The above monomers can be polymerized alone or in admixture with each other in accord with the process of this invention to produce homopolymers or copolymers.

In addition to homopolymers and copolymers, there may also be produced modified polymeric products by effecting the polymerization in the presence of materials which are non-polymerizable under the conditions employed, but which combine with a plurality of units of the monomer. The products obtained by such a telomerization, or chain-transfer reaction, may be represented by the formula $Y(A)_nZ$, in which A is a divalent radical formed from a polymerizable monomer, $n$ is an integer of 2 to 50, or even higher, and Y and Z are fragments terminally attached to a chain of monomer units, which fragments form together a molecule of the nonpolymerizable compound, e.g., a halogenated compound, for example, carbon tetrachloride, chloroform, an acid, such as isobutyric acid, an acid anhydride or ester, such as, acetic anhydride, methyl acetate, methyl propionate, etc., an acetal such, as, dioxolane, a mercaptan, bisulfite, alcohol, ether, silicon halide, hydrogen halide, etc. Products of this type are disclosed in U.S. Patents 2,390,099, 2,395,292, 2,398,426, 2,402,137, and 2,407,181. In a similar manner hydrogen may be employed to give modified polymers.

Although a reaction medium is not necessary, in some instances advantages accrue from the use of a medium which is unreactive toward the nitrogen fluoride under the conditions of reaction. Suitable media are benzene, water, methanol, ethanol, acetone, diethyl ketone, chlorobenzene, tetrachloroethylene, dichlorodifluoromethane, and the like. The amount of reaction medium is not critical and it can equal the weight of monomer or it can exceed it by 50 or more fold.

The process of this invention provides a new catalyst which has a remarkable range of applicability and hence is an improvement over previously used catalysts for polymerizing, copolymerizing, and telomerizing unsaturated monomers capable of addition polymerization. The polymers and copolymers produced with these catalysts have improved thermal stability by virtue of having terminal fluorine.

The examples which follow are submitted further to illustrate but not to limit this invention. The nitrogen trifluoride used in Examples I through XV contained trace amounts of dinitrogen difluoride, as determined by chromatographic analysis. The dinitrogen difluoride, nitrogen trifluoride, and dinitrogen tetrafluoride of the other examples were pure products, as determined by chromatography, except in those instances in which special mention has been made of the use of a mixture of nitrogen fluorides. See Examples XXIII and XXXVI–XXXVIII. It will be understood that in describing the percentage concentration of the gaseous nitrogen fluorides, the percent given is mol percent.

*Example I*

A 200 ml. stainless steel pressure reactor was charged with 8.02 g. of nitrogen trifluoride ($NF_3$) and the charge heated to 150° C. Over a period of one hour there was then added 9.9 g. of tetrafluoroethylene. The charge was maintained at 150° C. for six hours. The pressure within the reactor was ca. 360 lb./sq. in. There was obtained 8.0 g. of fluffy white polytetrafluoroethylene, having a sticking point of 296° C., melting at 320° C., and soluble in hot chlorofluoro liquids. The product was free of nitrogen.

There was also obtained 7.94 g. of volatile material which mass spectrographic analysis showed to be chiefly nitrogen trifluoride and tetrafluoroethylene.

*Example II*

A 9.8 g. charge of maleic anhydride was placed in an 80 ml. stainless steel pressure reactor. A total of 3.18 g. nitrogen trifluoride was injected in small aliquots at 100° C., 150° C., 200° C., and 240° C., and the mixture maintained at 240° C. for another three hours. There was obtained 8.0 g. of a black gummy solid, insoluble in water. There was also obtained 5.86 g. of volatile product, which by mass spectrographic analysis was found to be chiefly carbon dioxide, with some nitrogen trifluoride, nitrogen, and carbon monoxide.

*Example III*

An 80 ml. stainless steel pressure reactor was charged with 14.87 g. of perfluorobutyne-2, $CF_3C{\equiv}C{-}CF_3$, and a total of 5.6 g. of nitrogen trifluoride was injected at 0° C., 100° C., 150° C., 200° C., and 250° C. The mixture was maintained at 250° C. for another four hours at 725 lb./sq. in. pressure. There was obtained 4.0 g. of a cream-colored polymer and 13.96 g. of volatile products. The polymer was infusible on a spatula and finally sublimed and/or decomposed at a very elevated temperature. It analyzed 0.13% N. The voltatile product by mass spectrometry was found to be 1% $N_2$, 68% nitrogen trifluoride, 9% carbon tetrafluoride, 28% perfluorobutyne-2, and traces of other materials.

*Example IV*

A charge consisting of 14.0 g. of hexafluoropropylene and 6.9 g. of nitrogen trifluoride was placed in an 80 ml. stainless steel pressure reactor and heated six hours at 300° C. and 1000 lb./sq. in. pressure. There was obtained 2.0 g. of a mobile liquid, which did not contain nitrogen and by nuclear magnetic resonance appeared to be a mixture of low molecular weight hexafluoropropylene polymers. Infrared absorption analysis showed the presence of C—F bonds. There was also obtained 17.08 g. of volatile products.

The above experiment was repeated, using 28 g. of hexafluoropropylene and 14.3 g. of nitrogen trifluoride.

There was obtained 6.0 g. of a liquid which boiled at 49° to 141° C. Nuclear magnetic resonance analysis of various fractions indicated that each fraction was a mixture of products. Vapor phase chromatography of one fraction indicated the present of ten components. There was also obtained 33 g. of volatile material.

Example V

A 7.1 g. charge of nitrogen trifluoride was placed in an 80 ml. stainless steel pressure reactor and heated to 250° C. At this temperature, 9.8 g. of tetrafluoroethylene was injected. The temperature and pressure were maintained for one hour at 250° C. and 1250 lb./sq. in. respectively. There was obtained white polymeric tetrafluoroethylene and volatile products.

Example VI

A charge consisting of 27 g. of vinyl fluoride and 0.3 g. nitrogen trifluoride was placed in an 80 ml. stainless steel pressure reactor and heated for one hour at 50° C., one hour at 100° C., and one hour at 150° C. There was obtained 5.4 g. of white polymer and 22.13 g. of volatile products. The polymer was molded at 210° C. and 10,000 lb./sq. in. pressure in five minutes to a tough clear film.

The above experiment was repeated omitting the nitrogen trifluoride. Under these conditions no polymer was obtained.

Example VII

About 86 g. of ethylene and 0.5 g. of nitrogen trifluoride were heated for one hour at 50° C., one hour at 100° C., and one hour at 150° C. at 900 atm. in a 200 ml. stainless steel pressure reactor. There was obtained 12.5 g. of white tough polymer, having a sticking point of about 107° C. A film was pressed from a portion of the polymer at 5000 lb./sq. in. and 160° C. in one minute. The film was colorless, tough, and cold-drawable.

Example VIII

A mixture of 30 g. of vinyl acetate and 0.3 g. nitrogen trifluoride was heated under autogenous pressure for one hour at 50° C., one hour at 100° C., and one hour at 150° C., in an 80 ml. stainless steel pressure reactor. The maximum pressure developed in the reactor was 160 lb./sq. in. There was obtained 20.8 g. soft sticky clear polymer. After solution in ethanol and precipitation in diethyl ether, the product was colorless, and weighed 14.0 g.

Example IX

A mixture of 30 g. of styrene and 0.3 g. of nitrogen trifluoride was heated under autogenous pressure for one hour at 50° C., one hour at 100° C., and one hour at 150° C., in an 80 ml. stainless steel pressure reactor. The maximum pressure developed was 80 lb./sq. in. There was obtained 23 g. of viscous clear liquid. The liquid was poured into excess methanol. There was recovered 6.0 g. of a white polymer.

Example X

A mixture of 30.0 g. of methyl methacrylate and 0.3 g. of nitrogen trifluoride was heated one hour at 50° C. and two hours at 100° C. in an 80 ml. stainless steel pressure reactor. The maximum pressure developed was 75 lb./sq. in. There was obtained 26.1 g. of a white, crystal clear polymer which was very tough to impact.

Example XI

A mixture of 30 g. of acrylonitrile and 0.3 g. of nitrogen trifluoride was heated one hour at 50° C. and two hours at 100° C. under autogenous pressure in an 80 ml. stainless steel pressure reactor. The maximum pressure developed was 85 lb./sq. in. There was obtained 26.0 g. of a white powdery product, which after removal of unreacted acrylonitrile, weighed 6.0 g.

Example XII

A 200 ml. stainless steel pressure reactor was charged with a mixture of 90% ethylene and 10% carbon monoxide. There was then added 0.5 g. of nitrogen trifluoride and the charge heated at 130° C. under 1500 atm. pressure. After three hours under these conditions, the reactor was cooled and the contents discharged. There was obtained 20.0 g. of a yellow-colored, tough, ethylene/carbon monoxide copolymer.

Example XIII

A 200 ml. stainless steel pressure reactor was filled with 60 cc. of water, 2 g. of sodium dodecyl sulfate, 0.1 g. sodium hydroxide, 40 g. of butadiene, and 0.5 g. of nitrogen trifluoride. After five hours at 60° C., five hours at 100° C., and five hours at 120 C., there was obtained a dispersed polymer of polybutadiene, which was precipitated by pouring the dispersion into methyl alcohol. The polymer was washed and milled on a small rubber mill to yield 17.0 g. of light tan material which resembled natural rubber.

Example XIV

Thirty grams of hexafluoropropylene, 10 g. of tetrafluoroethylene, and 0.3 g. of nitrogen trifluoride were added to an 80 ml. stainless steel pressure reactor to which had been previously added 20 cc. of the liquid hexafluoropropylene dimer composed of a mixture of the following structural isomers:

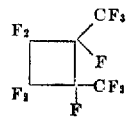

and

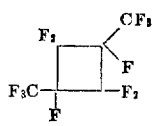

After two hours at 120° C., there was obtained 2.2 g. of a white solid copolymer of tetrafluoroethylene and hexafluoropropylene.

Example XV

To a 200 ml. stainless steel pressure reactor there was added 70 cc. of benzene, 0.5 g. nitrogen trifluoride, and ethylene (ca. 100 g.). After two hours at 100° C. and 1490 atm., there was obtained a benzene slurry of polyethylene from which 4.7 g. of white polyethylene was obtained by removal of the benzene.

Example XVI

The reactor of Example II was charged with 20 g. of tetrafluoroethylene, 25 cc. of cyclic hexafluoropropylene dimer, 5.1 mg. of dinitrogen difluoride. The charge was heated at 75° C. for four hours under autogenous pressure. There was obtained 18 g. of white polytetrafluoroethylene.

The above experiment was repeated with a charge consisting of ca. 73 g. of tetrafluoroethylene, 25 cc. of cyclic hexafluoropropylene dimer, and 10 mg. of dinitrogen difluoride. After a 2-hour reaction time at 75° C. there was obtained 42 g. of white polytetrafluoroethylene.

Example XVII

An 80 ml. stainless steel pressure reactor was charged with 10 g. of tetrafluoroethylene, 30 g. of hexafluoropropylene, 20 cc. of cyclic hexafluoropropylene dimer, and 3 mg. of dinitrogen difluoride. The charge was heated at 75° C. under autogenous pressure for two hours. There was obtained 7.5 g. of a white tetrafluoroethylene/hexafluoropropylene copolymer.

The above experiment was repeated except that the amount of dinitrogen difluoride used was 6 mg. instead of 3 mg. There was obtained 8 g. of a white tetrafluoroethylene/hexafluoropropylene copolymer.

Example XVIII

An 80 ml. stainless steel pressure reactor was charged with 20 g. of tetrafluoroethylene, 20 cc. of cyclic hexafluoropropylene dimer, and 0.5 g. of nitrogen trifluoride and the charge heated for two hours at 75° C. under autogenous pressure. There was obtained 18 g. of white polytetrafluoroethylene.

Example XIX

An 80 ml. stainless steel pressure reactor was charged with 30 g. of acrylonitrile and 0.5 g. of nitrogen trifluoride. The charge was heated under autogenous pressure at 50° C. for one hour and then at 100° C. for two hours. There was obtained 10 g. of white polymer.

The above experiment was repeated except that methyl methacrylate was used instead of acrylonitrile. There was obtained 3 g. of tough polymer.

The viscosities given in Examples XX through XXIII were determined at 30° C. on solutions containing 0.10 g. of polymer per 100 cc. of a solvent consisting of 87% by weight of tetrahydrofuran and 13% dimethylformamide.

Example XX

Forty ml. of deoxygenated water was placed in an 80 ml. stainless steel reactor which was then closed, cooled to −80° C., and evacuated to about 1 mm. of mercury pressure. To the evacuated reactor there were added 10 mg. of dinitrogen difluoride ($N_2F_2$), 12 g. of hexafluoropropylene, and 12 g. of vinylidene fluoride. The reactor was closed, heated to 89° C. over a period of three hours, and then maintained at 89–96° C. for an additional seven hours. A pressure of 1160 lb./sq. in was attained at the end of the three-hour heating period, which subsequently dropped to 450 lb./sq. in. by the end of the seven hours. The reactor was then cooled and vented. An aqueous slurry of white polymer was removed from the reactor, filtered, and dried. There was obtained 15 g. of dry polymer.

Infrared analysis showed the polymer to contain 68% vinylidene fluoride units by weight. The inherent viscosity was 0.90. A clear rubbery film was obtained by heating on a rubber roll mill at 100° C. A portion of the polymer was heated in air in an oven at 288° C. for 110 hours. The loss in weight observed under this treatment was only 6.9%, as compared with a loss in weight of 14.8% in a similar polymer prepared with the conventional ammonium persulfate-sodium bisulfite catalyst system.

Example XXI

A hexafluoropropylene-vinylidene fluoride copolymer was prepared by the procedure of Example XX. This polymer had an inherent viscosity of 0.66, and a vinylidene fluoride content of 74% units by weight, as determined by infrared analysis. Ten grams of this polymer was compounded on a rubber roll mill with 1.5 g. of magnesium oxide, 1.8 g. of medium thermal black, and 0.1 g. of hexamethylenediamine carbamate. The mixture was heated in a mold in a press for 30 minutes at 134° C., removed from the press and heated in an oven for one hour at 100° C., one hour at 140° C., and then 24 hours at 204° C. The cured product had the following stress-strain properties:

Tensile strength at the break, lb./sq. in. _____ 2810
Modulus at 100% elongation, lb./sq. in. _____ 1680
Elongation at the break, percent _____ 230

Example XXII

Thirty-five ml. of perfluorodimethylcyclohexane ($CF_3C_6F_{10}CF_3$) was placed in an 80 ml. stainless steel reactor which was closed, cooled to −80° C., and evacuated to 1 mm. of mercury pressure. There were then added 12 mg. of dinitrogen difluoride, 12 g. of hexafluoropropylene, and 12 g. of vinylidene fluoride. The reactor was closed and heated to 100° C. over a period of four hours, and then held at 100–101° C. for nine hours. The maximum pressure developed was 600 lbs./sq. in. At the end of the heating period it was 480 lbs./sq. in. The reactor was cooled, vented, and 8.7 g. of white polymer were recovered. The polymer had an inherent viscosity of 0.51, and analyzed 76% vinylidene fluoride units by weight, as determined by infrared analysis. It formed a smooth sheet when worked on a cold rubber mill.

Example XXIII

Two hundred ml. of deoxygenated water was added to a 400 ml. stainless steel reactor which was then closed, cooled in a solid carbon dioxide-acetone bath, and evacuated. There were then added, in order, 3 g. of a mixture of nitrogen fluorides analyzing 96.2% nitrogen trifluoride ($NF_3$), 1.7% trans dinitrogen difluoride, 1.0% cis dinitrogen difluoride, 0.8% air, and 0.3% nitrous oxide, 45 g. of hexafluoropropylene, 10 g. of tetrafluoroethylene, and 45 g. of vinylidene fluoride. The reactor was closed and heated to 75° C. over a period of 45 minutes and held there for one hour. The temperature was raised 5° C. every hour for three hours, held at 90° C. for three hours, raised to 100° C. rapidly, where it was held for three hours, raised rapidly to 110° C. and held there for three hours. The reactor was cooled to room temperature, vented, the coagulated polymer separated, and dried in a vacuum oven at 50° C. The dried polymer obtained weighed 40 g. and had an inherent viscosity of 1.55. Nuclear magnetic resonance analysis showed the composition to be, by weight, 52% vinylidene fluoride units, 20% hexafluoropropylene units, and 28% tetrafluoroethylene units.

Example XXIV

Twenty ml. of cyclic hexafluoropropylene dimer (as solvent), 19.5 g. of tetrafluoroethylene, and 100 mg. of perfluorodimethyl nitrogen fluoride, $(CF_3)_2NF$, prepared as described by J. Thompson et al., J. Chem. Soc. 1949, (3080), were charged to an 80 ml. stainless steel shaker tube. The mixture was heated to 75° C. over two hours, at 150° C. over two hours, and held at 150° C. for two hours. The reactor was allowed to cool, opened, discharged, and solvent removed. There was obtained 13.8 g. of white polytetrafluoroethylene.

Example XXV

Ten ml. of vinyl chloroformate and 10 mg. of cis-dinitrogen difluoride were charged to an 80 cc. stainless steel reactor and the charge heated two hours at 50° C. and two hours at 75° C. There was obtained 8 g. of tough polymer.

Example XXVI

Sixteen ml. of vinylene carbonate and 11 mg. of cis-dinitrogen difluoride were charged to an 80 cc. stainless steel reactor and the charge heated two hours at 50° C., two hours at 75° C., and two hours at 100° C. There were obtained 9 g. of tough polymer.

Example XXVII

A reactor was charged with 11.5 g. of an approximately 1:1 molar mixture of cis- and trans-1-chloro-1,2-difluoroethylene and 11 mg. of trans-dinitrogen difluoride and the charge heated at 110° C. for two hours. There was recovered 3.5 g. of a colorless polymer having an inherent viscosity of 0.34, measured at 0.5% concentration in acetone at 25° C. Clear, colorless films were cast from solutions of the polymer in acetone. These films had a sticking temperature of 75° C. The polymer is soluble in ether and carbon tetrachloride but is relatively insoluble in 95% ethanol.

Example XXVIII

A mixture of 20.4 g. of tetrafluoroethylene, 20 ml. perfluorodimethylcyclobutane and 18 mg. of dinitrogen tetrafluoride was heated in an 80 ml. stainless steel-lined shaker reactor at 135–150° C. for seven hours. The polymer obtained was separated by filtration and dried in a vacuum oven to leave 8.1 g. of polytetrafluoroethylene.

Example XXIX

A mixture of 30 g. of hexafluoropropylene, 20.3 g. of tetrafluoroethylene, 20 ml. of perfluorodimethylcyclobutane, and 45 mg. of dinitrogen tetrafluoride, prepared as described in J. Am. Chem. Soc. 80, 5004 (1958), was heated at 152° C. for 12.5 hours in an 80 ml. stainless steel-lined shaker reactor. The polymer was separated by filtration and dried in a vacuum oven to leave 15.7 g. of white copolymer. Infrared analysis showed the copolymer to contain 13 mole percent of hexafluoropropylene.

Example XXX

A mixture of 31 g. of hexafluoropropylene, 10 g. of tetrafluoroethylene, 20 ml. of perfluorodimethylcyclobutane, and 37 mg. of dinitrogen tetrafluoride, prepared as described in J. Am. Chem. Soc. 80, 5004 (1958), was heated in an 80 ml. stainless steel-lined shaker tube at 155° C. for 12 hours. A total of 5.7 g. of white copolymer was obtained. The product analyzed for 15 mole percent of hexafluoropropylene.

Example XXXI

A mixture of 11 g. of vinylidene fluoride, 11 g. of hexafluoropropylene and 36 mg. of dinitrogen tetrafluoride, prepared as described in J. Am. Chem. Soc. 80, 5004 (1958), was heated in an 80 ml. stainless steel-lined shaker reactor at 225° C. for 6.5 hours. The yield of polymer, a white, rubbery solid, was 9.8 g.

Example XXXII

A mixture of 19.6 g. of tetrafluoroethylene, 20 ml. of perfluorodimethylcyclobutane, and 53 mg. of dinitrogen tetrafluoride, prepared as described in J. Am. Chem. Soc. 80, 5004 (1958), was heated in an 80 ml. stainless steel pressure reactor at 125° C. for eight hours. The polymer produced was separated by filtration and dried in a vacuum oven to leave 4.8 g. of white, solid polytetrafluoroethylene.

Example XXXIII

An 80 ml. stainless steel pressure reactor was charged with 30 g. of vinyl acetate and 0.5 g. of nitrogen trifluoride and the mixture heated under autogenous pressure at 50° C. for one hour, then for one hour at 100° C., and finally for one hour at 150° C. There was thus obtained 9 g. of tough white polymer, after removal of unreacted monomers.

Example XXXIV

An 80 ml. pressure reactor was charged with 30 g. of styrene and 0.5 g. of nitrogen trifluoride, and the charge was heated under autogenous pressure at 50° C. for one hour and then at 100° C. for another hour. There was obtained 4 g. of a white polymer, after removal of unreacted monomer.

Example XXXV

A 300 ml. stainless steel pressure reactor was charged with ca. 100 g. of ethylene and 0.5 g. of nitrogen trifluoride. The mixture was heated at 108° C. for six hours under 1500 atm. pressure. There was obtained 21 g. of tough white polyethylene.

Example XXXVI

A stainless steel lined stirred autoclave having a free volume of one liter was charged with 500 grams of water and 1 gram of a mixture of nitrogen fluorides analyzing 98% nitrogen trifluoride, 1% dinitrogen difluoride, 0.3% nitrous oxide and 0.3% nitrogen. After heating to 80° C., the autoclave was pressured with vinylidene fluoride to a pressure of 4,000 p.s.i. As reaction proceeded, additions of vinylidene fluoride were made as needed to maintain the pressure at 4,000±50 p.s.i. After two hours, there was obtained 5 grams of a white polymer, insoluble in water. A clear, tough, pliable film was made by pressing a gram of this polymer for five minutes in a platen press maintained at 260° C., at a pressure of about 550 p.s.i.

Example XXXVII

The polymerization of vinylidene fluoride was repeated following the procedure described in Example XXXVI above, except that the initial charge to the autoclave consisted of 500 grams of water and 4 grams of a mixture of nitrogen fluorides analyzing 98% nitrogen trifluoride, 1% dinitrogen difluoride, 0.3% nitrous oxide and 0.3% nitrogen. At the end of 75 minutes, 46 grams of white polymer, insoluble in water, was recovered. A clear, tough, pliable film was pressed from this polymer under the conditions described in Example XXXVI above.

Example XXXVIII

Sixty ml. of omega-hydroperfluorooctene was charged to a 100 ml. stainless steel autoclave, pressured with tetrafluoroethylene to 35 atmospheres and heated to 80° C. To the heated charge was added 0.00237 mol of a gas mixture composed of 2.03% of trans-$N_2F_2$, 1.98% of cis-$N_2F_2$ and $NF_3$ as the remainder. The autoclave was maintained at 80° C. for 18 minutes after heating the catalyst, then cooled and discharged. There was obtained as a solid residue 21.7 grams of polymer containing 0.65% of combined omega-hydroperfluorooctene as determined by infrared measurement. The polymer melted at 320° C. and had a melt viscosity of $3.2 \times 10^5$ poises as measured at 380° C. under a shear stress of 6.5 pounds per square inch. A 5-mil thick film molded from the polymer showed a flex life of over 200,000 cycles.

In the foregoing detailed illustrative examples, the polymerizations have been effected batchwise. It is to be understood that this has been for convenience only and that the process can be operated as a semi-continuous or continuous operation.

The detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. In a process for polymerizing unsaturated monomers which undergo addition polymerization, the improvement wherein the monomer is polymerized in the presence of at least 0.0001% by weight of said monomer of at least one nitrogen fluoride of the group consisting of dinitrogen difluoride, dinitrogen tetrafluoride, and nitrogen fluorides of the formula

in which $X_1$ and $X_2$ are selected from the class consisting of fluorine and perfluoroaliphatic hydrocarbon radicals.

2. The process of claim 1 wherein the nitrogen fluoride is dinitrogen difluoride.

3. In a process for polymerizing unsaturated monomers which undergo addition polymerization, the improvement wherein the monomer is polymerized under positive pressure in the presence of at least 0.0001% by weight of said monomer of at least one nitrogen fluoride of the group consisting of dinitrogen difluoride, dinitrogen tetrafluoride, and nitrogen fluorides of the formula

in which $X_1$ and $X_2$ are selected from the class consisting of fluorine and perfluoroaliphatic hydrocarbon radicals.

4. In a process for polymerizing unsaturated monomers which undergo addition polymerization, the improvement wherein the monomer is polymerized under positive pressure at a temperature up to 300° C. and in the presence of at least 0.0001% by weight of said monomer of at least one nitrogen fluoride of the group consisting of dinitrogen difluoride, dinitrogen tetrafluoride, and nitrogen fluorides of the general formula

in which $X_1$ and $X_2$ are selected from the class consisting of fluorine and perfluoroaliphatic hydrocarbon radicals.

5. In a process for polymerizing unsaturated monomers which undergo addition polymerization, the improvement wherein the monomer is polymerized in a reaction medium under positive pressure of a temperature up to 300° C. and in the presence of at least 0.0001% by weight of said monomer of at least one nitrogen fluoride of the group consisting of dinitrogen difluoride, dinitrogen tetrafluoride, and nitrogen fluorides of the formula

in which $X_1$ and $X_2$ are selected from the class consisting of fluoride and perfluoroaliphatic hydrocarbon radicals, said medium being unreactive to said nitrogen fluoride under the conditions of reaction.

6. In a process for polymerizing unsaturated monomers which undergo addition polymerization, the improvement wherein the monomer is polymerized under a pressure of from 3 to 3000 atmospheres in the presence of at least 0.0001% by weight of said monomer of at least one nitrogen fluoride of the group consisting of dinitrogen difluoride, dinitrogen tetrafluoride, and nitrogen fluorides of the formula

in which $X_1$ and $X_2$ are selected from the class consisting of fluorine and perfluoroaliphatic hydrocarbon radicals.

7. In a process for polymerizing unsaturated monomers which undergo addition polymerization, the improvement wherein the monomer is polymerized under a pressure of from 3 to 3000 atmospheres and a temperature of from 25° to 275° C. and in the presence of at least 0.0001% by weight of said monomer of at least one dinitrogen fluoride of the group consisting of dinitrogen difluoride, nitrogen tetrafluoride, and nitrogen fluorides of the formula

in which $X_1$ and $X_2$ are selected from the class consisting of fluorine and perfluoroaliphatic hydrocarbon radicals.

8. In a process for polymerizing perhaloolefins, the improvement wherein the perhaloolefin is polymerized in the presence of at least 0.0001% by weight of said perhaloolefin of at least one nitrogen fluoride of the group consisting of dinitrogen difluoride, dinitrogen tetrafluoride, and nitrogen fluorides of the formula

in which $X_1$ and $X_2$ are selected from the class consisting of fluorine and perfluoroaliphatic hydrocarbon radicals.

9. The process of claim 8 wherein the nitrogen fluoride is dinitrogen difluoride.

10. In a process for preparing copolymers of perhaloolefins, the improvement which comprises effecting the polymerization of the perhaloolefins under positive pressure in the presence of at least 0.0001% by weight of said perhaloolefin of at least one nitrogen fluoride of the group consisting of dinitrogen difluoride, dinitrogen tetrafluoride, and nitrogen fluorides of the formula

in which $X_1$ and $X_2$ are selected from the class consisting of fluorine and perfluoroaliphatic hydrocarbon radicals.

11. A process for preparing copolymers of tetrafluoroethylene and ethylenically unsaturated fluorocarbons of 2 to 9 carbon atoms which comprises polymerizing tetrafluoroethylene and at least one of said fluorocarbons under positive pressure at a temperature up to 300° C. and in the presence of at least 0.0001% of the combined weight of said tetrafluoroethylene and said ethylenically unsaturated fluorocarbon of at least one nitrogen fluoride of the group consisting of dinitrogen difluoride, dinitrogen tetrafluoride, and nitrogen fluorides of the formula

in which $X_1$ and $X_2$ are selected from the class consisting of fluorine and perfluoroaliphatic hydrocarbon radicals.

12. The process of claim 11 wherein said fluorocarbon is omega-hydroperfluorooctene.

13. The process of claim 11 wherein said fluorocarbon is hexafluoropropylene.

14. A process for preparing copolymers of hexafluoropropylene with vinylidene fluoride which comprises polymerizing the hexafluoropropylene and vinylidene fluoride under positive pressure at a temperature up to 300° C. and in the presence of at least 0.0001% of the combined weight of said hexafluoropropylene and said vinylidene fluoride of at least one nitrogen fluoride of the group consisting of dinitrogen difluoride, dinitrogen tetrafluoride, and nitrogen fluorides of the formula

in which $X_1$ and $X_2$ are selected from the class consisting of fluorine and perfluoroaliphatic hydrocarbon radicals.

15. A process for preparing interpolymers of vinylidene fluoride, hexafluoropropylene and tetrafluoroethylene which comprises polymerizing tetrafluoroethylene, hexafluoropropylene and vinylidene fluoride under positive pressure at a temperature up to 300° C. and in the presence of at least 0.0001% of the combined weight of said vinylidene fluoride, said hexafluoropropylene and said tetrafluoroethylene of at least one nitrogen fluoride of the group consisting of dinitrogen difluoride, dinitrogen tetrafluoride, and nitrogen fluorides of the formula

in which $X_1$ and $X_2$ are selected from the class consisting of fluorine and perfluoroaliphatic hydrocarbon radicals.

16. In a process for polymerizing fluoroolefins, the improvement wherein the fluoroolefin is polymerized in the presence of at least 0.0001% of the weight of said fluoroolefin of at least one nitrogen fluoride of the group consisting of dinitrogen difluoride, dinitrogen tetrafluoride, and nitrogen fluorides of the formula

in which $X_1$ and $X_2$ are selected from the class consisting of fluorine and perfluoroaliphatic hydrocarbon radicals.

17. The process of claim 16 wherein said fluoroolefin is tetrafluoroethylene.

18. The process of claim 16 wherein said fluoroolefin is hexafluoropropylene.

19. In a process for polymerizing unsaturated monomers which undergo addition polymerization, the improvement wherein the monomer is polymerized under positive pressure in the presence of an amount within the range of 0.1 to 30% by weight of said monomer of at least one nitrogen fluoride of the group consisting of dinitrogen difluoride, dinitrogen tetrafluoride, and nitrogen fluorides of the formula

in which $X_1$ and $X_2$ are selected from the class consisting of fluorine and perfluoroaliphatic hydrocarbon radicals.

References Cited in the file of this patent
UNITED STATES PATENTS

| | | |
|---|---|---|
| 2,757,167 | Cook | July 31, 1956 |
| 2,862,029 | Smith | Nov. 25, 1958 |

UNITED STATES PATENT OFFICE
CERTIFICATION OF CORRECTION

Patent No. 2,963,468                  December 6, 1960

Charles S. Cleaver

It is hereby certified that error appears in the above numbered patent requiring correction and that the said Letters Patent should read as corrected below.

Column 4, line 59, for "voltatile" read -- volatile --; column 6, line 16, for "120 C." read -- 120° C. --; column 11, line 38, for "of" read -- at --; line 50, for "fluoride" read -- fluorine --; same column 11, line 75, for "dinitrogen", first occurrence, read -- nitrogen --; column 12, line 1, for "nitrogen", first occurrence, read -- dinitrogen --.

Signed and sealed this 30th day of May 1961.

(SEAL)
Attest:

ERNEST W. SWIDER
Attesting Officer

DAVID L. LADD
Commissioner of Patents